United States Patent [19]

Kuronaga et al.

[11] Patent Number: 4,917,042

[45] Date of Patent: Apr. 17, 1990

[54] AUTOMOBILE PART DEGREASING AND PAINTING APPARATUS WITH IMPROVED DEGREASING MEANS

[75] Inventors: Tadayoshi Kuronaga; Yuji Tanaka, both of Hiroshima, Japan; Kikuo Kato, Belleville, Mich.

[73] Assignee: Mazda Motor Manufacturing (USA) Corporation, Flat Rock, Mich.

[21] Appl. No.: 239,613

[22] Filed: Aug. 31, 1988

[51] Int. Cl.[4] .......................... B05C 1/02; B05C 3/10; B01D 5/00; B08B 3/10

[52] U.S. Cl. .......................................... 118/72; 34/73; 62/238.5; 118/663; 134/11; 134/12; 134/56 R; 202/169

[58] Field of Search ................. 118/676, 72, 666, 686, 118/663; 134/72, 56 R, 72, 11, 13, 18, 12; 34/73, 74; 62/238.5; 202/169, 170

[56] References Cited

U.S. PATENT DOCUMENTS

| | | | |
|---|---|---|---|
| 1,911,926 | 5/1933 | Robertson | 202/169 |
| 3,015,576 | 1/1962 | Hendrixson | 202/170 |
| 3,030,913 | 4/1962 | Arnold et al. | 202/170 |
| 3,042,547 | 7/1962 | Pickett | 134/72 |
| 3,073,721 | 1/1963 | Pokorny | 118/72 |
| 3,613,699 | 10/1971 | Holm | 202/170 |
| 4,055,196 | 10/1972 | Kearney | 202/169 |
| 4,078,974 | 3/1978 | McCord | 202/170 |
| 4,537,660 | 8/1985 | McCord | 202/170 |
| 4,615,768 | 10/1986 | McCord | 134/12 |
| 4,698,915 | 10/1987 | Dickinson | 134/11 |

FOREIGN PATENT DOCUMENTS

| | | | |
|---|---|---|---|
| 2741128 | 6/1988 | Fed. Rep. of Germany | 118/686 |
| 61-178083 | 8/1961 | Japan . | |

*Primary Examiner*—Jay H. Woo
*Attorney, Agent, or Firm*—Wenderoth, Lind & Ponack

[57] ABSTRACT

An apparatus for degreasing plastic automobile parts has a degreasing tank with a liquid degreasing agent reservoir in the bottom thereof and a degreasing vapor space thereabove, a heater in the reservoir for heating degreasing agent for vaporizing it, and a parts conveyor extending through the tank and having a downwardly inclined portion extending downwardly into the degreasing vapor space from one end to a nadir within the degreasing vapor space and an upwardly inclined portion extending out of the degreasing vapor space. Several cooling coils extend around the inside of the tank with an uppermost cooling coil at a level corresponding to the top of the degreasing vapor space and the remaining coils being spaced downwardly into said degreasing vapor space at intervals. The cooling coils are supplied with cooling medium under the control of a flow controller for causing cooling medium to flow through respective cooling coils the height of which in the degreasing vapor space is directly related to the speed of the conveyor, whereby the time a part being conveyed spends in degreasing vapor can be kept substantially constant regardless of the speed of the conveyor.

5 Claims, 2 Drawing Sheets

AUTOMOBILE PART DEGREASING AND PAINTING APPARATUS WITH IMPROVED DEGREASING MEANS

The present invention relates to an apparatus for degreasing and painting automobile parts, particularly plastic automobile parts having a coating thereon of a release material for releasing them from the plastic molds, and more particularly relates to an improved degreasing apparatus for use along the degreasing conveyor.

BACKGROUND OF THE INVENTION

It has been known that in order to ensure that plastic auto parts have a coat of paint thereon which adheres well, the parts must be degreased before they are painted in order to remove the mold releasing agent, which has been used to ensure the release of the plastic parts from the plastic mold. The necessity for degreasing articles to be painted is, of course, not limited to automobile parts, but extends to any part which has an oily coating, which must be removed before the article can be properly painted.

The conventional method of degreasing such parts is to pass them through a vapor bath formed from a degreasing solution, for example 1.1.1 trichloroethane. A reservoir of degreasing solution is provided in the degreasing apparatus, and a heater is provided in the reservoir, which, upon being heated, vaporizes the degreasing solution to form a vapor both of the degreasing solution in a vapor space immediately above the reservoir.

In the art of degreasing plastic automobile parts, particularly bumpers and the like, the degreasing apparatus has been provided with a cooling coil which extends around the upper part of the apparatus to limit the height to which the vapor can escape. The cooling coil effectively condenses the vapor which attempts to rise higher than the cooling coil, and the condensed vapor is normally returned to the reservoir of degreasing solution. One such apparatus is disclosed in Published Japanese Application No. 61-178083, published Aug. 9, 1961. In this published application, FIG. 4 shows the conventional apparatus, in which the cooling coil 4 limits the vapor space to the position of the chain line in the tank 1 of the degreasing apparatus.

In an apparatus for painting automobile parts by conveying them past a painting station where plastic parts, such as automobiles bumpers, are being painted, it is sometimes necessary to increase or reduce the speed of the painting conveyor depending upon the conditions at the point where the parts are being painted. In a continuous production process, the parts, such as bumpers, coming from the molding operation, are fed through a degreasing apparatus on a degreasing conveyor, and then transferred through a discharge-feed station and fed to the painting conveyor. The degreasing conveyor is conventionally run at a speed which attempts to match the speed of the painting conveyor as closely as possible. However, when the painting conveyor is slowed down too much, the degreasing conveyor reaches a lower limit, and at a speed below this lower limit, the plastic parts, such as bumpers, remain in the vapor both formed from the degreasing solution for a period which is too long, and the vapor tends to penetrate the plastic, which results in an imperfect adherence of the paint to the plastic part.

Heretofore, as shown in FIG. 1, in order to accommodate the mismatch of the speed of the degreasing conveyor A, where the painting conveyor B has been slowed down below the speed at which a corresponding speed of the degreasing conveyor A will hold the parts in the degreasing apparatus for too long a period of time, a buffer transfer apparatus is used to transfer the degreased bumpers from the degreasing conveyor A to the painting conveyor B. The buffer transfer apparatus can, when the speeds of the respective conveyors are more or less matched, transfer the parts directly from the degreasing conveyor to the painting conveyor. However, when the painting conveyor slows down too much, it diverts some of the parts to storage, and, when the painting conveyor then resumes a speed which is greater than that of the degreasing conveyor, the stored parts are brought back through the buffer transfer apparatus for transfer to the painting conveyor B.

As can be understood, the use of a buffer transfer apparatus increases the complexity and expense of the apparatus, requires a larger floor space, particularly for the storage facility, and can create difficulties in the operation of the degreasing and painting process if the buffer transfer apparatus fails to operate properly.

OBJECT AND BRIEF SUMMARY OF THE INVENTION

It is an object of the present invention to provide an improved degreasing apparatus which can, despite variations in the speed of the degreasing conveyor, ensure that the parts being conveyed remain in the degreasing vapor bath for a substantially constant amount of time.

It is a further object of the present invention to provide a painting system for painting automobile parts including the improved degreasing apparatus.

To this end, the present invention provides an apparatus for degreasing plastic automobile parts which comprises a degreasing tank having a liquid degreasing agent reservoir in the bottom thereof with a degreasing vapor space thereabove, heater means in the reservoir for heating degreasing agent for vaporizing it, a parts conveyor extending through the tank from one end to the other and having a downwardly inclined portion extending downwardly into the degreasing vapor space from one end to a nadir within the degreasing vapor space and an upwardly inclined portion extending out of the degreasing vapor space. A plurality of cooling coils extends around the inside of the tank with an uppermost cooling coil at a level corresponding to the top of the degreasing vapor space, and the remaining coils being spaced downwardly into the degreasing vapor space at intervals from the uppermost cooling coil. Means is connected to the cooling coils for supplying a cooling medium to the cooling coils, which means includes flow control means for each coil. A means is provided for controlling the coil flow control means for causing cooling medium to flow through the respective cooling coils, the height of the particular cooling coil in the degreasing vapor space being directly related to the speed of the conveyor. As a result, the time which a part being conveyed spends in the degreasing vapor can be kept substantially constant, regardless of the speed of the conveyor.

Other and further objects will become apparent from the following specification and claims, taken together with the accompanying drawings.

DETAILED DESCRIPTION OF THE INVENTION

Figure 3:
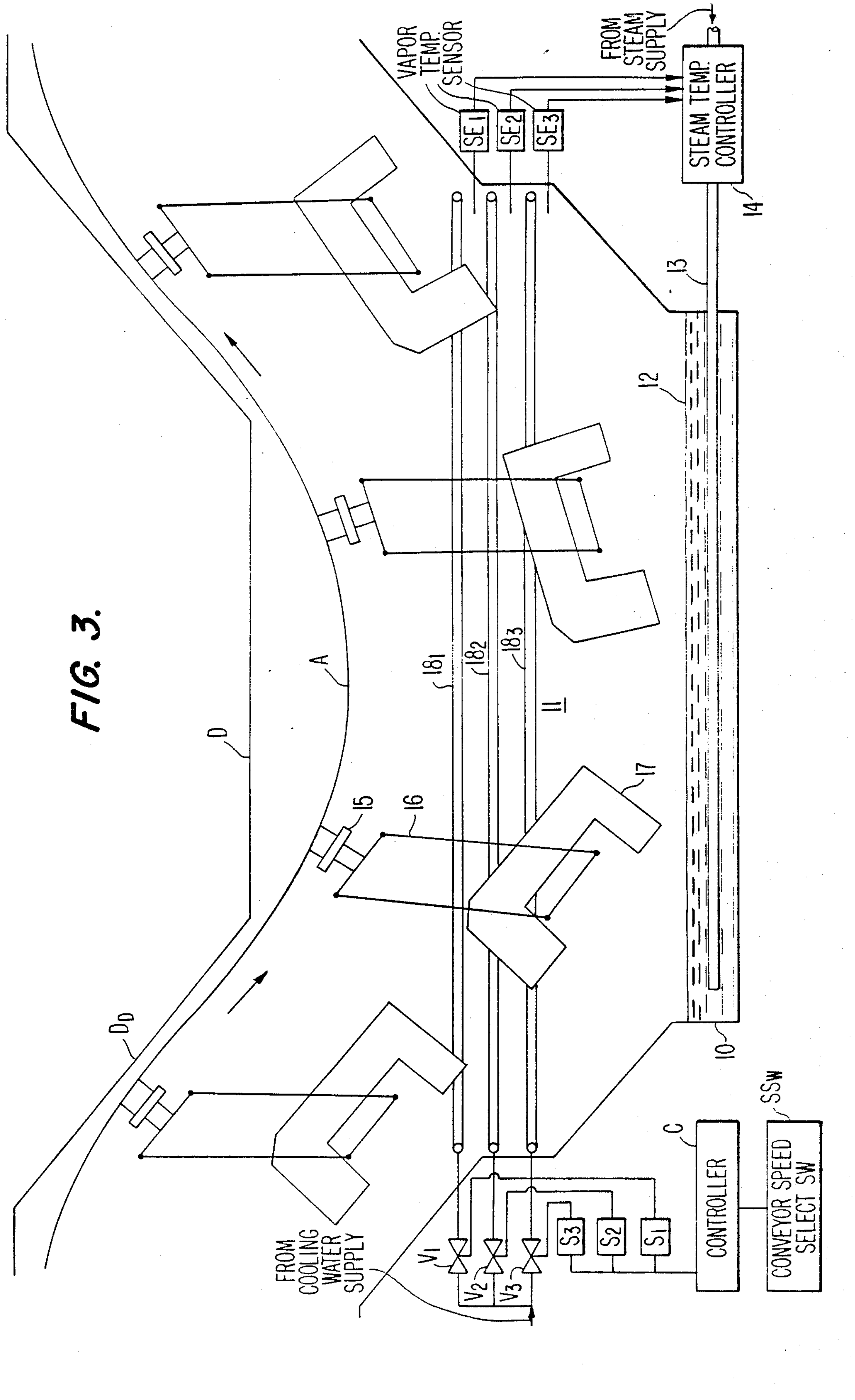
FIG. 3 is a schematic side elevation view of the degreasing apparatus according to the present invention.

A preferred embodiment of the improved degreasing apparatus of the present invention is shown in FIG. 3. The apparatus comprises a degreasing tank D having a degreasing agent reservoir 10 at the bottom thereof, for containing a reservoir of vaporizable degreasing agent, such as the 1.1.1 trichloroethane degreasing solution mentioned above in connection with the prior art. A heater 13 extends into the reservoir 10 for heating the degreasing agent so as to cause it to vaporize. In the preferred embodiment, the heater is a steam pipe system, which circulates steam from a steam supply (not shown) through the pipe 13 under the control of a conventional steam temperature controller 14.

A degreasing vapor space 11 is provided above the reservoir 10, and the upper limit thereof is defined by a cooling coil $\mathbf{18}_1$, which extends around the periphery of the tank D, and which, when supplied with cooling medium, such as cold water, creates a barrier to the rise of vapor above the level of this cooling coil $\mathbf{18}_1$.

In the preferred embodiment, two further coils $\mathbf{18}_2$ and $\mathbf{18}_3$ are spaced downwardly from the level of the cooling coil $\mathbf{18}_1$, and similarly extend around the inside of the tank D. Similarly, when these coils are respectively supplied with a cooling medium, they limit the height to which the vapor from the reservoir 10 can rise within the tank D.

Cooling medium flow control means are provided for each of the cooling coils $\mathbf{18}_1$, $\mathbf{18}_2$ and $\mathbf{18}_3$, and in the preferred embodiment, these are electrically controlled valves $V_1$, $V_2$ and $V_3$, which control the flow of cooling fluid, such as cooling water, from a cooling medium supply (not shown). The valves are respectively controlled by switches $S_1$, $S_2$ and $S_3$, for controlling the flow of cooling medium through the valves in an on-off control. The switches $S_1$, $S_2$ and $S_3$ are in turn controlled from a controller C, which controls the switches so that one of them is controlled so as to be on, i.e. to open the corresponding valve, and the remaining ones of which are controlled to be off, i.e. to close the corresponding valves.

It will thus be seen that when the valve $V_1$ is open and the valves $V_2$ and $V_3$ are closed, cooling medium circulates through the cooling coil $\mathbf{18}_1$, and vapor rising from the degreasing agent 12 into the degreasing vapor space can rise as high as the level of the cooling coil $\mathbf{18}_1$. Thus, the vapor space will have a depth corresponding to the height of the cooling coil $\mathbf{18}_1$ above the reservoir 10.

Likewise, when the controller controls the switches to close valve $V_1$ and valve $V_3$ and to open valve $V_2$, the cooling coil $\mathbf{18}_2$ will define the upper limit of the body of vapor in the degreasing vapor space $\mathbf{18}_2$. In this case, the height of the vapor space will be less than is the case when the cooling medium is circulating in the cooling coil $\mathbf{18}_1$.

Similarly, the flow of cooling medium through the cooling coil $\mathbf{18}_3$ will reduce the height of the degreasing vapor space 11 to a minimum.

A parts conveyor A extends through the apparatus, and has a downwardly inclined portion $D_D$, which extends on a downward incline to a nadir at about the middle of the apparatus just above the cooling coil $\mathbf{18}_1$, and then has an upwardly inclined portion $D_U$, extending at an angle upwardly out of the apparatus. The conveyor has carriers 15 with carrying frames 16 mounted thereon for carrying parts 17, such as auto bumpers along the conveyor.

A plurality of vapor temperature sensors $SE_1$, $SE_2$ and $SE_3$ are provided, one adjacent each of the corresponding cooling coils $\mathbf{18}_1$, $\mathbf{18}_2$ and $\mathbf{18}_3$, and these in turn are connected to the steam temperature controller for controlling the operation of the steam temperature controller to increase or decrease the amount of steam to maintain the vapor temperature in the vicinity of the corresponding cooling coil at the desired vapor temperature, so as to ensure that the degreasing agent vapor fills the degreasing vapor space up to the level of the corresponding coil.

It will be seen that a part conveyed along the conveyor A at a certain speed will, if the cooling coil $\mathbf{18}_1$ is operated, enter the degreasing vapor space with the degreasing vapor therein at a point above and to the left of the point at which it will enter the degreasing vapor space if either the coil $\mathbf{18}_2$ or the coil $\mathbf{18}_3$ is being supplied with cooling medium. Thus, at a given speed, the automobile part will remain in the degreasing agent vapor for a longer period of time if the cooling coil $\mathbf{18}_1$ is being supplied with cooling medium than if the cooling coil $\mathbf{18}_2$ or the cooling coil $\mathbf{18}_3$ is being supplied with a cooling medium.

It will thus be understood that, conversely, if at a given conveyor speed the part remains in the vapor space for a time T when the cooling coil $\mathbf{18}_1$ is being supplied with cooling medium, the conveyor can be slowed down and the cooling coil $\mathbf{18}_2$ supplied with cooling medium, so as to cause the part 17 to remain in the degreasing agent vapor for substantially the same period of time. Further, the apparatus can be slowed still further and the cooling medium supplied to the cooling coil $\mathbf{18}_3$, and the time of immersion of the part in the degreasing agent vapor can still be kept at the time T.

It will thus be understood that even if the conveyor is slowed down in order to reduce the supply of degreased parts at the discharge end, by proper control of the supply of cooling medium to the cooling coils, the time for which the part is exposed to the degreasing agent vapor can be kept substantially constant.

Figure 2:
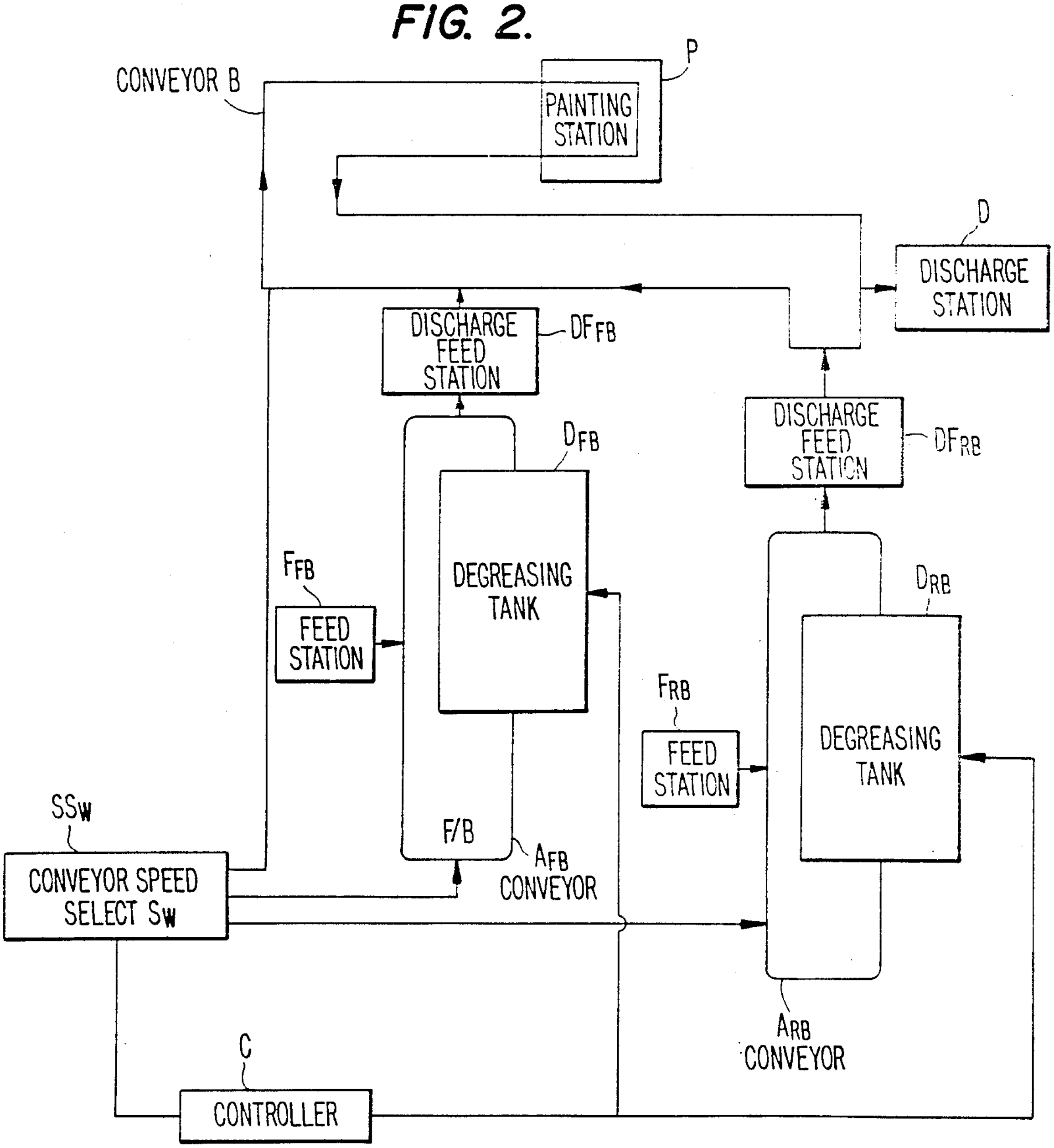
FIG. 2 is a diagram of a painting apparatus according to the present invention, incorporating the new degreasing apparatus therein.

The manner in which the improved degreasing apparatus improves the overall painting apparatus can be seen from reference to FIG. 2, in which a system for painting automobile bumpers is shown schematically.

The painting conveyor D conveys parts, such as automobile front bumpers FB, and automobile rear bumpers RB through a painting station, where they are painted, to a discharge station. The respective types of automobile bumpers are separately supplied to separate degreasing conveyors $A_{FB}$ for the front bumpers and $A_{RB}$ for the rear bumpers, through respective feed stations $F_{FB}$ and $F_{RB}$. Each of the degreasing conveyors has a degreasing apparatus $D_{FB}$ and $D_{RB}$, respectively, as shown in FIG. 3 and described in connection therewith. Between the respective degreasing conveyors $A_{FB}$ and $A_{RB}$ are discharge-feed apparatuses $DF_{FB}$ and $DF_{RB}$, which receive degreased bumpers from the degreasing conveyors and transfer them directly to the painting conveyor B, without providing for storage of bumpers.

Figure 1:
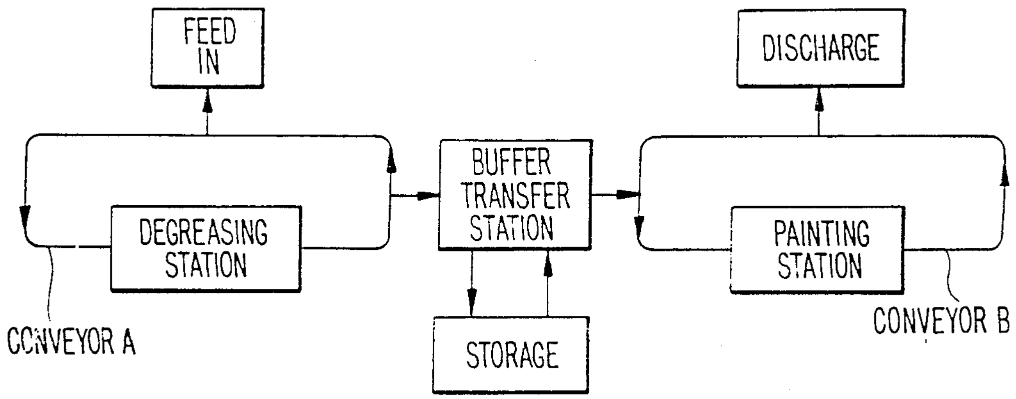
FIG. 1 is a diagrammatic view of a prior art painting apparatus.

When the painting conveyor B must be slowed down because of conditions at the painting station, it is unnecessary to provide means for removing bumpers at the discharge-feed apparatuses and storing them, as in the prior art apparatus as shown in FIG. 1. Instead, it is necessary only to slow down the respective degreasing conveyors $A_{FB}$ and $A_{RB}$, and to operate the coil flow control means to control the valves $V_1$, $V_2$ and $V_3$, so as to provide cooling medium to a desired cooling coil so that the part, such as the bumper 17, will remain in the degreasing agent vapor for the same time because at the slower speed, it passes through a smaller volume of the degreasing agent vapor.

The painting apparatus can be provided with a conveyor speed selection switch for controlling the speed of the respective conveyors, and the output of this switch can be connected to the controller C for controlling the coil flow control means and the valves $V_1$, $V_2$ and $V_3$ to provide a flow of cooling medium to a corresponding cooling coil $\mathbf{18}_1$, $\mathbf{18}_2$ or $\mathbf{18}_3$, depending upon the selected speed of the respective conveyors. Thus, where a speed $Sp_1$ is selected for the respective conveyors, the output from the conveyor speed select switch $SS_w$ to the controller causes the controller to actuate switch $S_1$, which in turn opens valve $V_1$ so as to control flow of cooling medium only to cooling coil $\mathbf{18}_1$. When the conveyor speed select switch $SS_w$ is actuated to select a speed $Sp_2$, which is slower than speed $Sp_1$, the output to the controller causes the controller to actuate switch $S_2$ so as to open valve $V_2$ to supply cooling fluid only to coil $\mathbf{18}_2$.

It will thus be seen that by the provision of the cooling coils at the respective levels in the degreasing tank, and providing cooling medium to the respective coils, the time which the part 17 being degreased spends in the degreasing agent vapor can be kept substantially constant, despite changes in the speed of the degreasing conveyor A. This prevents overexposure of the plastic parts 17 to the degreasing vapor, while at the same time making it unnecessary to provide a storage means in a buffer transfer apparatus between the degreasing conveyor and the painting conveyor, permitting the use of a simple discharge-feed apparatus at this point in the system.

What is claimed is:

1. An apparatus for degreasing plastic automobile parts, comprising:

- a degreasing tank having a liquid degreasing agent reservoir in the bottom thereof with a degreasing vapor space thereabove;
- heater means in said reservoir for heating degreasing agent for vaporizing it;
- a parts conveyor extending through said tank from one end to the other and having a downwardly inclined portion extending downwardly into said degreasing vapor space from one end to a nadir within said degreasing vapor space and an upwardly inclined portion extending out of said degreasing vapor space;
- a plurality of separate cooling coils extending around the inside of said tank with an uppermost cooling coil at a level corresponding to the top of said degreasing vapor space and the remaining coils being spaced downwardly into said degreasing vapor space at intervals from said uppermost cooling coil;
- means connected to said cooling coils for supplying a cooling medium to said coils, said means separately controlling flow of cooling medium including flow control means for each coil; and
- means for controlling the speed of said parts conveyor and said flow control means such as to cause cooling medium to flow selectively through respective cooling coils which are at a height in said degreasing vapor space relative to the other cooling coils which is in direct relation to the speed of said parts conveyor for keeping the time a part being conveyed spends in degreasing vapor substantially constant regardless of the speed of the conveyor.

2. An apparatus as claimed in claim 1 in which said coil flow control means comprise valves, and said control means for controlling said coil flow control means comprise valve actuating means.

3. An apparatus as claimed in claim 1 in which said conveyor means comprises speed selection means, and said speed selection means is connected to said control means for controlling said coil flow control means for automatically controlling the respective cooling coils through which cooling medium flows in response to the selected speed of operation of said conveyor means.

4. An apparatus as claimed in claim 1 further comprising vapor temperature sensors positioned adjacent each of said cooling coils for sensing the vapor temperature in the vicinity of the coil, and heating temperature control means connected to said heater means and to which said sensors are connected for controlling said heater means in response to the sensed vapor temperature.

5. An apparatus for painting automobile parts comprising:

- a painting conveyor having a painting station along the conveyor path thereof through which parts conveyed by said painting conveyor are conveyed for being painted, and having a discharge station along the conveyor path downstream of said painting station;
- a degreasing conveyor adjacent said painting conveyor and having a degreasing apparatus along the conveyor path thereof through which parts conveyed by said degreasing conveyor are conveyed for being degreased and having a discharge-feed station therealong downstream of said degreasing apparatus for feeding degreased parts directly to said painting conveyor immediately as they are discharged from said degreasing conveyor;

said degreasing apparatus having:

- a degreasing tank having a liquid degreasing agent reservoir in the bottom thereof with a degreasing vapor space thereabove;
- heater means in said reservoir for heating degreasing agent for vaporizing it;
- said degreasing conveyor extending through said tank from one end to the other and having a downwardly inclined portion extending downwardly into said degreasing vapor space from one end to a nadir within said degreasing vapor space and an upwardly inclined portion extending out of said degreasing vapor space;
- a plurality of cooling coils extending around the inside of said tank with an uppermost cooling coil at a level corresponding to the top of said degreasing vapor space and the remaining coils being spaced downwardly into said degreasing vapor space at intervals from said uppermost cooling coil;

means connected to said cooling coils for supplying a cooling medium to said coils, said means including flow control means for each coil; and means for controlling said flow control means for causing cooling medium to flow through respective cooling coils the height of which in said degreasing vapor space is directly related to the speed of the degreasing conveyor, whereby the time a part being conveyed spends in degreasing vapor can be kept substantially constant regardless of the speed of the degreasing conveyor, and the degreasing conveyor can be run at a speed matching the speed of the painting conveyor without increasing the time the parts spend in the degreasing apparatus, and the parts can be fed directly from the degreasing conveyor to the painting conveyor without the need for storing degreased parts between the degreasing conveyor and the painting conveyor.

* * * * *